United States Patent [19]

Mahosky

[11] 4,143,885

[45] Mar. 13, 1979

[54] TRACTOR TRAILER LIFT RAILS

[76] Inventor: Barry A. Mahosky, 55 Charleston St., Wellsboro, Pa. 16901

[21] Appl. No.: 820,150

[22] Filed: Jul. 29, 1977

[51] Int. Cl.² .......................... B60D 1/00; B62D 21/00
[52] U.S. Cl. ............................................................ 280/477
[58] Field of Search .............. 280/106 R, 423 R, 477, 280/106 T, 425 R, 427, 434

[56] References Cited

U.S. PATENT DOCUMENTS

| | | | |
|---|---|---|---|
| 1,084,820 | 1/1914 | Pescatore | 280/434 |
| 1,548,967 | 8/1925 | Winn | 280/420 |
| 1,623,990 | 4/1927 | Winn | 280/429 |
| 1,785,697 | 12/1930 | Helms | 280/430 |
| 1,951,258 | 3/1934 | Retzlaff | 280/441 |
| 2,480,483 | 8/1949 | Kirksey | 280/422 |
| 3,811,706 | 5/1974 | Tucker | 280/407 |
| 3,894,749 | 7/1975 | Kozuh | 280/106 R |

*Primary Examiner*—Joseph F. Peters, Jr.
*Assistant Examiner*—R. Schrecengost
*Attorney, Agent, or Firm*—Berman, Aisenberg & Platt

[57] ABSTRACT

A pair of substantially identical elongated steel lift rails which are adapted to be mounted upon the ends of the rear frame members of a tractor of the fifth wheel coupling type. Each lift rail comprises an elongated steel member which slopes downwardly at its rearmost end and, when mounted on the frame member, presents an upwardly inclined surface. The lift rails facilitate the coupling of an associated trailer onto the tractor by, upon rearward movement of the tractor, lifting the trailer gradually to the proper height for coupling. The invention prevents damage to the trailer and tractor in those frequent cases where the boxcar of the trailer may become positioned below the normal coupling height.

5 Claims, 4 Drawing Figures

TRACTOR TRAILER LIFT RAILS

BACKGROUND OF THE INVENTION

1. Field of The Invention

The present invention is related to tractor trailers and, more particularly, is directed towards an improvement in tractor trailers intended to facilitate the coupling therebetween.

2. Description of The Prior Art

Tractor trailers which incorporate fifth wheel coupling mechanisms are well-known in the trucking industry. The term "fifth wheel" generally refers to a coupling mechanism positioned in the rear frame assembly of a tractor. A typical fifth wheel assembly includes a swivel plate pivotally mounted to the frame assembly and comprises a substantially planar plate having a pair of rearwardly depending ram members which define a V-shaped receiving slot for the kingpin of the trailer.

The kingpin depends downwardly from a steel plate or apron formed on the underside of the trailer frame at the forward end thereof. The normal manner of coupling the tractor to the trailer is to back the tractor up until the forward end of the apron engages the ramps on the fifth wheel assembly at which point the apron is guided up, the kingpin is automatically centered via the V-shaped slot, and the plate pivots to accept the kingpin at the center thereof. A locking mechanism is normally positioned below the swivel plate of the fifth wheel assembly to lock the kingpin in place when properly seated. The kingpin permits the trailer to swivel on the fifth wheel while the vehicle is turning either in a forward or reverse direction.

One problem arises when the trailer vehicle is for some reason positioned lower than the optimum height for coupling with the tractor. This can occur, for example, as a result of an overloaded trailer, uneven or soft ground, or the like. When the trailer, and hence apron and kingpin, are not in the proper horizontal plane, backing up of the tractor can cause severe damage to the front of the trailer, the rear of the tractor, the fifth wheel assembly, the kingpin and apron, and other parts of the coupling assembly. In other words, if the dolly wheels or pads of the trailer have settled into the ground, backing up of the tractor may, for example, create an impact between the rearwardly extending frame members of the tractor and the boxcar of the trailer to cause damage to either or both. This leads, in turn, to costly repairs and down times.

Prior United States patents in this general art area of which I am aware include: 1,084,820; 1,548,967; 1,623,990; 1,785,697; 1,951,258; 2,480,483; and 3,811,706. However, none of the foregoing address the problem referred to above.

OBJECTS AND SUMMARY OF THE INVENTION

It is therefore a primary object of the present invention to provide an improved coupling means for a tractor trailer of the fifth wheel type which overcomes all of the disadvantages noted above with respect to the prior art.

Another object of the present invention is to provide an improved device for a tractor trailer which assists the operator in coupling the trailer to the tractor when the tractor and trailer are not on the same horizontal plane.

A further object of the present invention is to provide an improved means for coupling a tractor and trailer of the fifth wheel type which reduces side pressure on the kingpin and also prevents damage to the tractor and trailer when coupling same together.

A still further object of the present invention is to provide an improved device for tractors which permit hookups to be made to trailers in subdued light conditions without damaging expensive components.

An additional object of the present invention is to provide means for facilitating the coupling between a trailer and a tractor which may be easily manufactured, installed, and removed, is simple in construction, contains no moving parts, is inexpensive, requires no maintenance, is light weight, and which may be utilized with modern day fifth wheel tractor trailers.

Another object of the present invention is to provide an improved fifth wheel tractor trailer coupling device which distributes the weight of the trailer over a wide area to thereby minimize strain on the fifth wheel kingpin.

The foregoing and other objects are attained in accordance with one aspect of the present invention through the provision of an improved tractor trailer coupling device for use in combination with a tractor having a pair of longitudinal, spaced, substantially parallel frame members and a fifth wheel assembly pivotally mounted between the frame members. The fifth wheel assembly includes a substantially planar plate having inclined ramp means integrally extending rearwardly thereof, the fifth wheel assembly being used to couple the tractor to the kingpin of an associated trailer. The improvement comprises means for lifting the front end of the associated trailer upon the backing of the tractor thereinto for facilitating coupling between the tractor and trailer.

In accordance with other aspects of the present invention, the means for lifting the front end of the associated trailer comprises a pair of substantially identical lift rails mounted respectively on the ends of the pair of parallel frame members. More particularly, the pair of lift rails are positioned rearwardly of the ramp means of the fifth wheel assembly, each of the lift rails comprising an elongated rail member having a downwardly depending rear end portion extending over and below the top surface of the respective ends of the frame members. When thus installed, each rail includes an upwardly inclined surface from the rear of the tractor towards the fifth wheel assembly. Each of the lift rails further comprises a downwardly depending flange formed at the forward end thereof which includes means extending therefrom for securing the rail to the frame.

In accordance with other aspects of the present invention, the undersurface of the downwardly depending rear end of each of the lift rails is welded to the rear end of the respective frame members. The rear end of each of the frame members may include a support member extending rearwardly therefrom and having an upper surface which is shaped so as to mate with and thereby support the undersurface of the downwardly depending rear end of the corresponding lift rail. Preferably, each of the lift rails further comprises a vertical support member positioned rearwardly of the downwardly depending flange and extending downwardly from the undersurface to the frame member so as to provide an intermediate support means for the lift rail. The rearmost end of each of the lift rails are preferably positioned at a height which is substantially below that of the ramp means of the fifth wheel assembly.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENT

Figure 1:
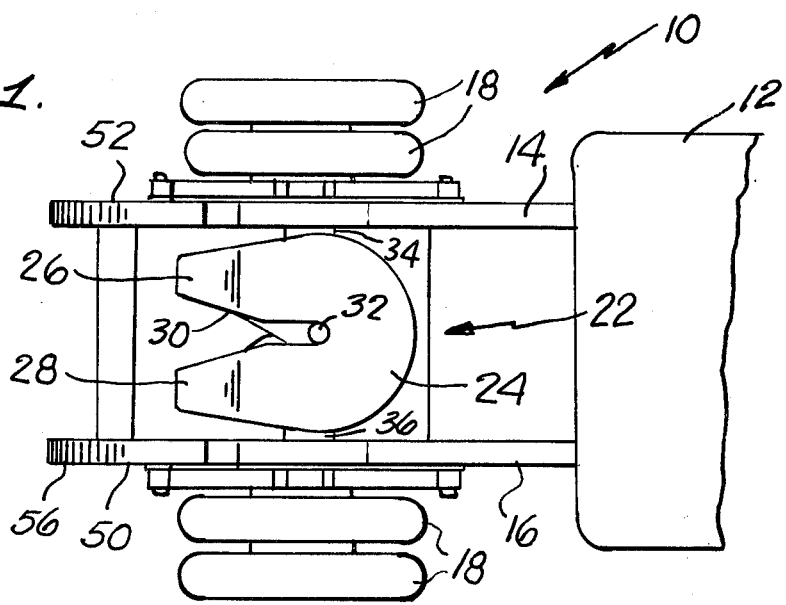
FIG. 1 is a top, partially broken view of a fifth wheel tractor incorporating a preferred embodiment of the present invention.

Referring now to the drawings, wherein like reference numerals indicate identical or corresponding parts throughout the several views, and more particularly to FIG. 1 thereof, indicated generally by reference numeral 10 is a standard tractor of the fifth wheel variety.

Tractor 10 includes a forwardly positioned cab 12 from the back of which extends a pair of rearwardly projecting frames 14 and 16. Mounted at the approximate mid-length of the frames 14 and 16 are a set of rear wheels 18 coupled to the frames 14 and 16 via a rear wheel axle 20.

Mounted intermediate the frame members 14 and 16, positioned approximately over rear axle 20, is a fifth wheel assembly indicated generally by reference numeral 22. As is conventional, the fifth wheel assembly 22 comprises a substantially planar plate member 24. The front portion of plate member 24 is somewhat circular, and from the rear portion extends a pair of rearwardly projecting ramp members 26 and 28 which are generally downwardly inclined with respect to the plane of plate member 24. Ramp members 26 and 28 together define a V-shaped notch opening 30 which terminates in the central portion of plate 24 in a pin-receiving slot 32. As is conventional, a locking mechanism (not shown) is generally associated with the pin-receiving slot 32, and is usually positioned below plate 24 as part of the fifth wheel mechanism 22.

Figure 2:
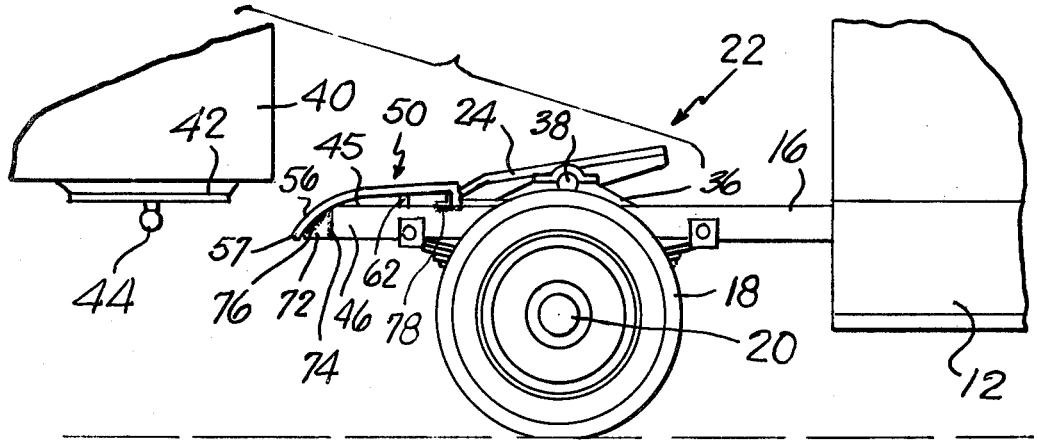
FIG. 2 is a side, elevational, partially broken view of the tractor illustrated in FIG. 1 and of an associated trailer.

The fifth wheel 22 is made pivotable on the frame members 14 and 16 via a pair of pivot supports 34 and 36. As seen in FIG. 2, pivot support 36 has a pivot pin 38 to which the underside of plate 24 is pivotally mounted.

FIG. 2 also illustrates the front end of a towed vehicle or trailer 40 which is shown in position preparatory to coupling to the tractor 10. As is conventional, on the underside of the trailer 40 at its front end is mounted an apron 42 which is comprised of a substantially steel plate mounted to the trailer frame. Centered on the apron 42 and extending downwardly is a conventional kingpin 44 which is adapted to be positioned within the pin-receiving slot 32 when the tractor and trailer are coupled. The kingpin 44 allows the trailer 40 to swivel on the fifth wheel plate 24 while the tractor trailer is turning in either a forward or reverse direction.

In normal operation, in order to couple the trailer 40 onto the tractor 10, the latter backs up until apron 42 is engaged upon the rearwardly projecting ramp members 26 and 28, whereupon the kingpin 44 becomes centered in the notch opening 30 until it becomes locked in slot 32 whereupon the apron 42 rests on plate 24 which is now aligned substantially horizontally.

As may be appreciated from FIG. 2, it is essential, in normal operation, for the lower portion of apron 42 to clear the upper surface of the rear portion 46 of the frame member 16 (and the corresponding upper surface of the rear portion of the other frame member 14) in order to be engageable by the rearwardly projecting ramp members 26 and 28. If, for any reason, the lowermost portion of apron 42 falls below the upper surface of the rear portion of frame members 14 and 16, and the tractor 10 is backed into the trailer 40, damage of some sort will be imparted either to the tractor 10, the trailer 40, the apron 42, the kingpin 44, or the fifth wheel assembly 22.

To remedy the foregoing situation, which may be caused by overweight in the forward end of the trailer 40 or by soft, uneven, or otherwise abnormal ground conditions, the present invention contemplates the provision of a pair of separately attachable, substantially identical lift rails indicated in FIGS. 1 and 2 by reference numerals 50 and 52. The lift rails 50 and 52 are preferably welded in place on the rear portion 46 of the frame members 14 and 16. Since the lift rails 50 and 52 are substantially identical, description of the structure of one of the lift rails will suffice for the other.

Figure 3:
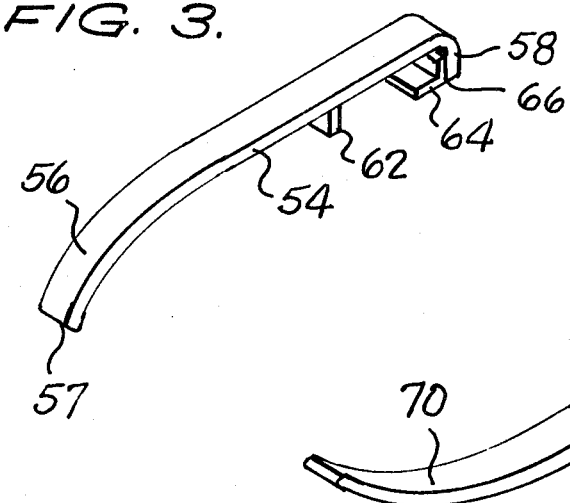
FIG. 3 is a perspective view of a preferred embodiment of the present invention.
Figure 4:
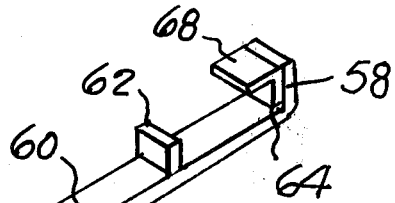
FIG. 4 is another perspective view of the preferred embodiment of the present invention illustrated in FIG. 3.

Referring now to FIGS. 3 and 4, one of the lift rails is illustrated in top and bottom perspective views, respectively, and is seen to comprise an elongated main support member 54 which is preferably comprised of three-quarter inch thick steel. The main support member 54 extends rearwardly so as to terminate in a downwardly curved portion 56. The forward end 58 of the main support member 54 is bent downwardly at an approximate 90° angle to the main support portion 54.

As seen more particularly in FIG. 4, positioned rearwardly of the forward portion 58 and extending vertically from the undersurface 60 of main support member 54 is a support piece 62. An L-shaped support member 64 is also connected to the forward portion 58 by means of its vertical flange 66.

By way of presenting the best mode presently contemplated for carrying out this invention, the overall length of the main support member is approximately twenty-four inches. The downwardly curved rear portion 56 is extended in such a fashion that, when installed on the frame 16 as illustrated in FIG. 2, it is lower than the plane defined by the undersurface 68 of member 64 by approximately seven inches. The support member 62 is preferably spaced from the L-shaped support member 64 by amount four and one-half inches, and the width of the main support member 54 is approximately three inches.

In installation of the lift rail 50 of the present invention, the curved undersurface 70 of the curved portion 56 is preferably welded as at 76 to the rear portion of the frame member 16. Further, the undersurface 68 of the L-shaped support member 64 is also preferably welded as at 78 to the top surface of frame member 16.

Since most conventional frame members 14 and 16 terminate at their rearmost portions 46 is a vertical edge as at 74, it is preferable to mount an additional support plate 72 thereto, as by welding. Support plate 72 includes an upper curved surface which mates with the undersurface 70 of the curved portion 56 of main support member 54 so as to provide additional support therefor.

It may be appreciated from FIGS. 1 and 2 that the lift rails 50 and 52 are mounted substantially rearwardly of fifth wheel assembly 22. Further, it may also be appreciated that the rearwardly and downwardly curved portion 56 extends over and below the top surface 45 of the respective ends of the frame members 14 and 16. Further, the lowermost end 57 of each of the lift rails 50 and 52 are positioned at a height which is substantially below that of the ramp members 26 and 28 of the fifth wheel assembly 22.

In the foregoing manner, if the apron 42 of the trailer 40 is positioned substantially lower than that illustrated, it will still be successfully guided up the inclined ramp 56 of lift rails 50 and 52 to be fed into position for ramp members 26 and 28. The lift rails 50 and 52, in other words, lift the trailer 40 and thereby prevent damage to the tractor, trailer, fifth wheel assembly 22, and kingpin 44. The invention further reduces the side pressure on the kingpin 44, and facilitates coupling of the tractor and trailer in reduced light conditions. The rails 50 and 52, being identical and made from readily available, inexpensive materials, may be quickly welded in place, and may be readily removed, if desired. No moving parts are involved, and costly repairs and down time associated with damaged assemblies of the prior art due to the type of horizontal misalignment discussed above, is obviated. The weight of the trailer 40 is distributed over a wide area via the two substantially parallel, inclined lift rails 50 and 52, which are particularly designed to be utilized in connection with modern day, fifth wheel tractors.

Obviously, numerous modifications and variations of the present invention are possible in light of the above teachings. It is therefore to be understood that within the scope of the appended claims, the invention may be practiced otherwise than as specifically described herein.

I claim as my invention:

1. For use with a tractor having a pair of longitudinal, spaced, substantially parallel frame members, a fifth wheel assembly pivotally mounted between said frame members, said fifth wheel assembly including a substantially planar plate having an inclined ramp integrally extending rearwardly thereof, said fifth wheel assembly used to couple said tractor to the king pin of an associated trailer, the improvement which comprises means adapted to lift the front end of said associated trailer upon the backing of said tractor thereinto for facilitating coupling between said tractor and trailer, said means comprising a pair of substantially identical lift rails adpated to be mounted respectively on the ends of said pair of parallel frame members so as to be positioned rearwardly of said ramp, each of said identical lift rails comprising:

an elongated rail member having a substantially planar, upwardly inclined main portion adapted to be positioned over the top surface of the respective frame member;

a downwardly depending flange formed at the forward end of said main portion adapted to be fastened to the top surface of said frame member; and a downwardly depending curved rear end portion extending integrally and rearwardly from said main portion to a position below the top surface of said frame member.

2. The apparatus as set forth in claim 1, wherein the undersurface of said downwardly depending curved rear end portion of each of said lift rails is adapted to be welded to the rear end of the respective frame members.

3. The apparatus as set forth in claim 2, wherein the rear end of each of said frame members includes a support member extending rearwardly therefrom and having a curved upper surface shaped so as to mate with and thereby support the undersurface of said downwardly depending curved rear end portion of said lift rail.

4. The apparatus as set forth in claim 1, wherein each of said lift rails further comprises a vertical support member positioned rearwardly of said downwardly depending flange and extending downwardly from the undersurface of said inclined main portion and adapted to be fastened to said top surface of said frame member.

5. The apparatus as set forth in claim 1, wherein the forward end of each of said lift rails are positioned in use at a height substantially the same as that of said ramp of said fifth wheel assembly.

* * * * *